United States Patent

Clausen

[11] Patent Number: 5,540,016
[45] Date of Patent: Jul. 30, 1996

[54] STRUCTURAL BEAM

[75] Inventor: Edvin L. Clausen, Tønder, Denmark

[73] Assignee: Norsk Hydro a.s., Oslo, Norway

[21] Appl. No.: 867,701

[22] PCT Filed: Jan. 7, 1991

[86] PCT No.: PCT/NO91/00002

§ 371 Date: Jul. 9, 1992

§ 102(e) Date: Jul. 9, 1992

[87] PCT Pub. No.: WO91/10582

PCT Pub. Date: Jul. 25, 1991

[30] Foreign Application Priority Data

Jan. 9, 1990 [NO] Norway ..................... 900109

[51] Int. Cl.$^6$ .................. B62D 25/02; B60R 19/02; B60J 5/04
[52] U.S. Cl. .................. 52/98; 296/188; 52/731.2; 52/731.3; 52/731.4; 52/731.6; 52/100; 52/631
[58] Field of Search ............... 52/731.2, 731.3, 52/731.4, 731.6, 98, 100, 631; 296/146 C, 188, 189

[56] References Cited

U.S. PATENT DOCUMENTS

| | | | |
|---|---|---|---|
| 1,574,563 | 2/1926 | Duff | 52/731.4 |
| 4,155,756 | 5/1979 | Perrot et al. | 75/231 |
| 4,288,398 | 9/1981 | Lemelson | 264/23 |
| 4,297,777 | 11/1981 | Kucza et al. | 29/420 |
| 4,630,413 | 12/1986 | Svensson | 52/98 |
| 4,708,390 | 11/1987 | Palentyn et al. | 52/731.6 |
| 4,919,473 | 4/1990 | Laimighofer et al. | 296/146 C |
| 5,046,777 | 9/1991 | Garnweidner et al. | 52/731.6 |

FOREIGN PATENT DOCUMENTS

| | | |
|---|---|---|
| 0267895 | 5/1988 | European Pat. Off. . |
| 0330759 | 9/1989 | European Pat. Off. . |
| 0390769 | 10/1990 | European Pat. Off. . |
| 479401 | 4/1992 | European Pat. Off. ........ 296/146 C |
| 3606024 | 8/1987 | Germany . |
| 3709489 | 7/1988 | Germany . |
| 3826958 | 3/1989 | Germany . |
| 4063720 | 2/1992 | Japan .................. 296/146 C |

*Primary Examiner*—Darnell M. Boucher
*Attorney, Agent, or Firm*—Wenderoth, Lind & Ponack

[57] ABSTRACT

A beam for reinforcement of a vehicle body is extruded as a hollow shape having substantially planar parallel longitudinally extending deformation walls each of which is of variable wall thickness along its length. Two laterally extending grooves define a deformation zone having a maximal wall thickness allowing for a controlled folding of the shape.

15 Claims, 2 Drawing Sheets

STRUCTURAL BEAM

BACKGROUND OF THE INVENTION

The present invention relates to a beam employed as a reinforcement of a vehicle body, in an impact structure or the like, and more particularly to a structural beam comprising a hollow shape having parallel or substantially parallel deformation walls oriented perpendicularly to a direction of anticipated load impact exposure.

Such beams are employed, e.g., in car doors as protection for vehicle occupants against a side collision. Apart from the need to absorb applied impact energy, the beam should also be as light as possible in order to avoid an unnecessary increase in body weight of the vehicle. German DE 3,606,024 discloses a beam of this type that is dimensioned over its entire length to absorb the actual maximal anticipated impact load. Consequently, such beam does not comply with the need regarding an optimal strength/weight relationship.

From German DE 380 724 it is known to resolve the above problem by provision of a constructed beam where one or more additional complementary shapes are connected to a hollow shape along the actual area to be exposed to an impact load. German DE 3,826,958 discloses a constructed beam consisting of two spot welded shapes locally reinforced by means of outwardly or inwardly positioned and fastened additional shapes. Rather complicated solutions are presented in both the above cases, and the application therein of additional shapes results in extra assembly operations and increased manufacturing costs.

SUMMARY OF THE INVENTION

The object of the present invention therefore is to provide a weight optimized beam exhibiting a variable deformation resistance along its length without the requirement for supplemental reinforcing elements or the need for extensive assembly machining of the beam.

This object is achieved according to the invention by provision of a beam comprising an integral one-piece, unitary extruded hollow shape having parallel deformation walls having a variable wall thickness along their longitudinal dimension. According to a preferred embodiment, the hollow shape is extruded to have a rectangular cross-sectional configuration with two parallel longitudinally extending walls arranged perpendicularly to a direction of impact load exposure, with a wall thickness of each wall gradually increasing from opposite longitudinal ends thereof towards a central deformation zone having a maximal wall thickness. The central zone of the deformation wall on the predicted impact load side of the shape may be delimited against end portions thereof by laterally extending grooves to ensure a controlled folding of the shape.

BRIEF DESCRIPTION OF THE DRAWINGS

The invention will be described in more detail in the following with reference to the accompanying drawings, wherein.

DETAILED DESCRIPTION OF THE INVENTION

Figure 1:
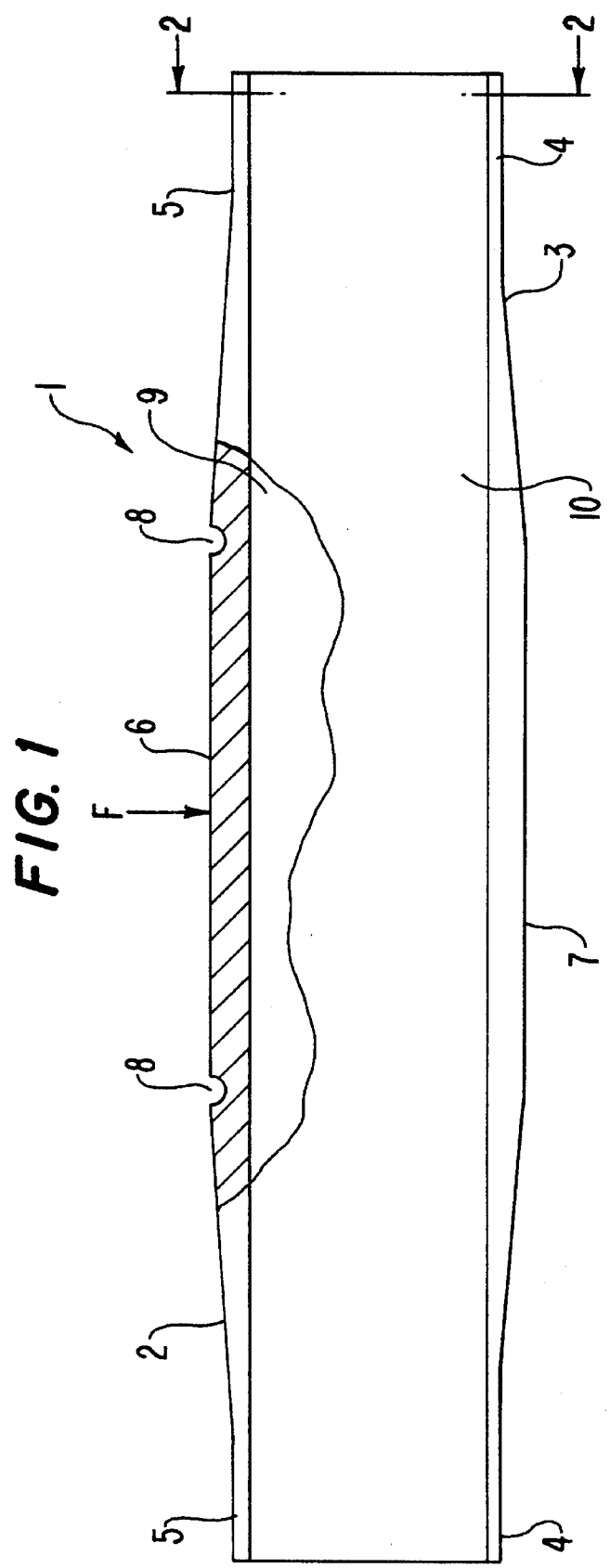
FIG. 1 is a longitudinal cross-sectional view schematically showing a hollow shape according to the invention.
Figure 2:
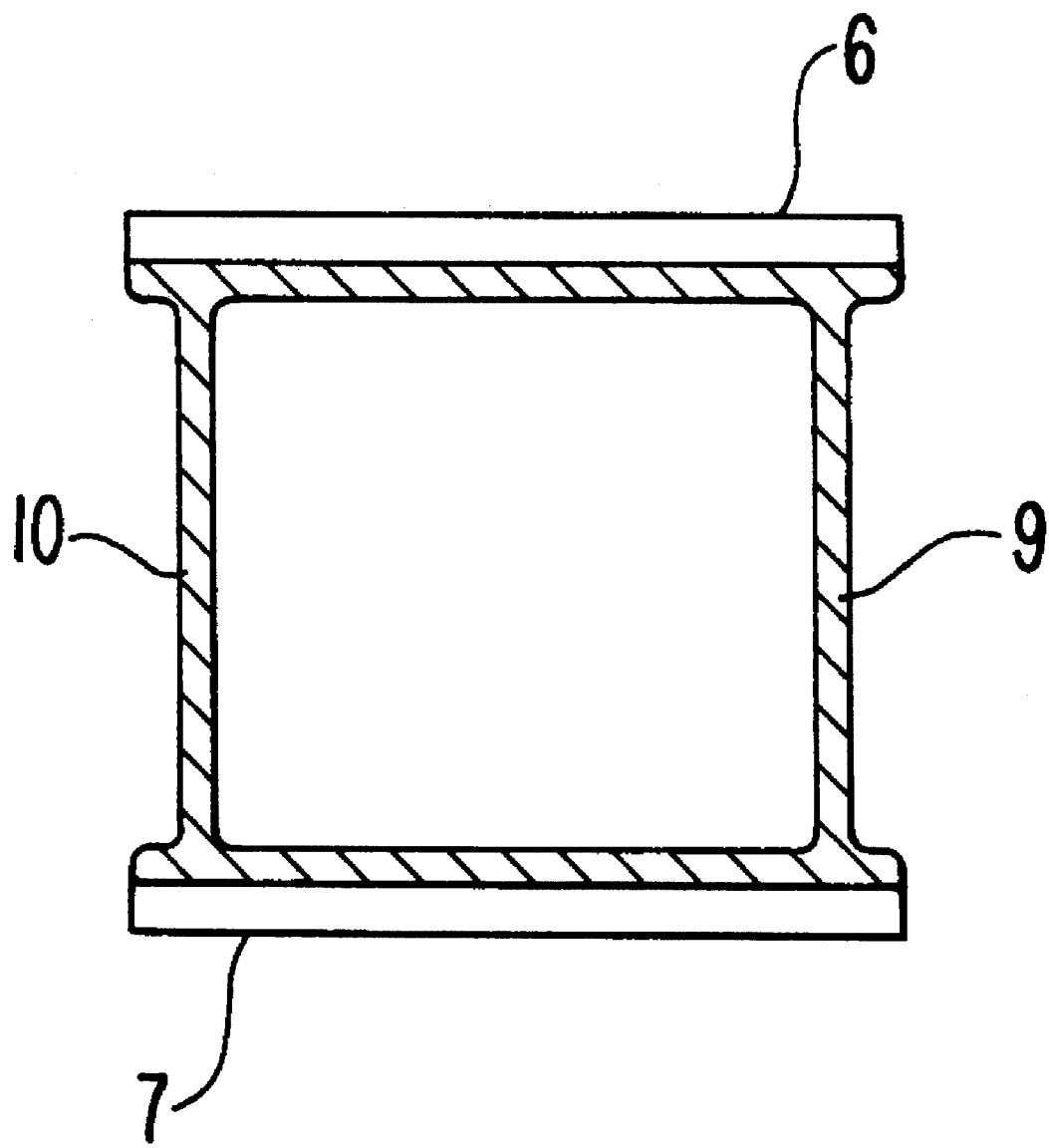
FIG. 2 is a transverse cross section of the hollow shape take along line 2—2 in FIG. 1.

A hollow shape 1 shown in FIGS. 1 and 2 has a substantially rectangular cross section and is extruded to have two opposite generally parallel and planar longitudinally extending deformation walls 2, 3 connected by two opposite substantially parallel and planar longitudinally extending connecting walls 9, 10. Each deformation wall 2, 3 has a gradually increasing wall thickness from each of opposite longitudinal ends 4 or 5 thereof toward a respective central deformation zone 6 or 7 thereof. The maximal wall thickness at zones 6 or 7 is dimensioned according to the expected impact load. As will be apparent particularly from FIG. 2, each connecting wall 9, 10 has a uniform wall thickness throughout the length or longitudinal extension thereof, and the wall thickness of connecting walls 9, 10 is less than the maximum wall thickness of deformation walls 2, 3, i.e. at zones 6, 7. As further shown in FIG. 2, deformation walls 2, 3 extend laterally outwardly beyond both of the connecting walls 9, 10.

The hollow shape having the desired longitudinal contour and wall thickness is provided ready to use in one simple extrusion operation without any need for subsequent machining, removal of excess material or similar operations. This can be done, e.g., by means of a radially movable tool attached to the orifice of a conventional extrusion die, the tool being periodically lowered at predetermined intervals and amplitudes to restrict the material flow and thus vary the wall thickness of the shape being extruded. As will be apparent from the drawing, the hollow shape or extrusion 1 is formed to be unitary and one-piece and is entirely free of seams or joints.

The deformation surface of a wall facing the direction of an expected impact load, indicated at F in FIG. 1, is furthermore provided with two laterally and parallelly extending grooves or rills 8 which limit the deformation zone against opposite end zones of the wall surface. This weakening of the wall thickness by means of grooves 8 ensures that a controlled folding of the hollow shape will be achieved in a defined area of the deformation wall during energy absorption, e.g. upon collision with a vehicle.

The hollow shape is preferentially provided as an extruded aluminum member of a high strength Al-alloy.

The illustrated rectangular configuration of the beam shape is only one possible embodiment. A hollow shape having, e.g., a flat oval or polygonal cross-section extruded in accordance with the invention to have a variable wall thickness increasing from opposite shape ends toward a central deformation zone of opposite deformation walls also can be employed as actual shape configurations.

The obvious advantages of the beam according to the invention are the possibility to achieve an optimal strength/weight ratio within a given space, minimal assembly machining and controlled development of shape folding with predicted localization of deformation zones. The beam of the invention also provides a smooth, gently curved surface, a feature that is advantageous for adaptation to other parts of a vehicle body.

I claim:

1. A beam for use in reinforcement of a structure such as a vehicle body against an impact load, said beam comprising:

an integral, unitary and one-piece longitudinally extending extruded hollow shape that is free of joints or seams and that includes at least two substantially parallel longitudinally extending deformation walls including one said deformation wall to be oriented perpendicular to a direction of expected impact load exposure and at least two substantially parallel longitudinally extending connecting walls connecting said deformation walls;

at least said one deformation wall having a wall thickness that varies over the direction of longitudinal extension thereof; and each said connecting wall having throughout the longitudinal extension thereof a uniform wall thickness that is less than a maximum wall thickness of said one deformation wall.

2. A beam as claimed in claim 1, wherein said one deformation wall has opposite longitudinal ends, and said wall thickness thereof varies between said opposite ends.

3. A beam as claimed in claim 2, wherein said wall thickness of said one deformation wall increases from each said opposite end thereof to a maximum wall thickness at a longitudinally central zone thereof.

4. A beam as claimed in claim 3, wherein said one deformation wall has an outer surface having formed therein at least one groove that extends transverse to said direction of longitudinal extension.

5. A beam as claimed in claim 3, wherein said one deformation wall has a planar inner surface and a curved outer surface.

6. A beam as claimed in claim 1, wherein said one deformation wall has a planar inner surface and a curved outer surface.

7. A beam as claimed in claim 1, wherein said hollow shape has a substantially rectangular transverse cross-sectional configuration including two spaced said deformation walls each having said varying wall thickness.

8. A beam as claimed in claim 7, wherein each of said two deformation walls has opposite longitudinal ends, and said wall thickness thereof varies between said opposite ends.

9. A beam as claimed in claim 8, wherein said wall thickness of each said deformation wall increases from each said opposite end thereof to a maximum wall thickness at a longitudinally central zone thereof.

10. A beam as claimed in claim 9, wherein said one deformation wall has an outer surface having formed therein at least one groove that extends transverse to said direction of longitudinal extension.

11. A beam as claimed in claim 9, wherein each said deformation wall has a planar inner surface and a curved outer surface.

12. A beam as claimed in claim 7, wherein each said deformation wall has a planar inner surface and a curved outer surface.

13. A beam as claimed in claim 1, wherein said hollow shape is extruded of aluminum.

14. A beam as claimed in claim 1, wherein said hollow shape is extruded of an aluminum alloy.

15. A beam as claimed in claim 1, wherein each said deformation wall extends laterally outwardly beyond said two connecting walls.

* * * * *